United States Patent [19]

Nagano et al.

[11] Patent Number: 4,679,449
[45] Date of Patent: Jul. 14, 1987

[54] SPEED METER DRIVE DEVICE FOR AUTOMOBILE

[75] Inventors: Shuji Nagano; Shuichiro Ida, both of Toyota; Toshio Yoshinaka, Nagoya, all of Japan

[73] Assignee: Toyota Jidosha Kabushiki Kaisha, Aichi, Japan

[21] Appl. No.: 738,227

[22] Filed: May 28, 1985

[30] Foreign Application Priority Data

Feb. 12, 1985 [JP] Japan .................. 60-18738[U]

[51] Int. Cl.⁴ .................. F16H 37/00; F16H 1/16
[52] U.S. Cl. .................................... 74/12; 74/425
[58] Field of Search ............ 74/12, 425, 458, 557

[56] References Cited

U.S. PATENT DOCUMENTS

| | | | |
|---|---|---|---|
| 1,324,788 | 12/1919 | Berge | 74/12 |
| 1,521,966 | 1/1925 | Olson et al. | 74/12 |
| 1,560,329 | 11/1925 | Schulze | 74/12 |
| 1,587,201 | 6/1926 | Tenney | 74/12 |
| 1,650,125 | 11/1927 | Gustafson | 74/12 |
| 1,726,421 | 8/1929 | Berge | 74/12 |
| 1,738,771 | 12/1929 | Gustafson | 74/12 |
| 1,809,734 | 6/1931 | Smith | 74/12 |
| 4,466,300 | 8/1984 | Takahashi | 74/12 |

FOREIGN PATENT DOCUMENTS

| | | | |
|---|---|---|---|
| 0137745 | 8/1982 | Japan | 74/12 |
| 0077153 | 5/1984 | Japan | 74/12 |

Primary Examiner—Lawrence Staab
Attorney, Agent, or Firm—Parkhurst & Oliff

[57] ABSTRACT

The mounting of a speed meter drive gear for an automobile is improved. That is, the speed meter drive gear is provided on an outer circumferential surface of a connecting member for transmitting a driving force such as to a companion flange mounted to an output shaft of a transmission. With this arrangement, a shaft length of the output shaft of the transmission may be shortened, thereby preventing creation of vibration, making the drive gear lightweight, and decreasing a joint angle of a propeller shaft.

1 Claim, 4 Drawing Figures 4,679,449

SPEED METER DRIVE DEVICE FOR AUTOMOBILE

BACKGROUND OF THE INVENTION (1) Field of the Invention

This invention relates to a speed meter drive device mounted in a transmission for an automobile.

(2) Description of the Prior Art

Conventionally, as shown in FIG. 4, a speed meter drive gear 5 for driving a speed meter (not shown) for an automobile is in serration engagement with an output shaft 1 on a front side (a left-hand side in FIG. 4) of a boss portion 2a of a connecting member 2 such as a companion flange and a center brake drum, etc. which member is also in serration engagement with the output shaft at a rear end portion thereof (a right-hand end portion in FIG. 4) of a transmission or a transfer (both of which will be referred to as a transmission mechanism) for an automobile. The connecting member 2 is fixed to the output shaft 1 by a washer 3 and a nut 4, and is connected to a propeller shaft (not shown) by bolts 9. The output shaft 1 as well as a front portion thereof is supported to a housing 8 of the transmission mechanism through a bearing 10. Reference numeral 11 designates a spacer interposed between the speed meter drive gear 5 and the bearing 10. An inner race 10a of the bearing 10 abuts against the spacer 11 and is mounted to the output shaft 1, while an outer race 10b is mounted to the housing 8. A speed meter driven gear 6 is mounted to the housing 8, and is meshed with the speed meter drive gear 5. Reference numeral 7 designates an oil seal interposed between the housing 8 and the boss portion 2a of the connecting member 2.

As is mentioned above, since the speed meter drive gear 5 is positioned on the front side of the boss portion 2a of the connecting member 2, and the spacer 11 is further arranged on the front side of the drive gear 5, a free length portion of the output shaft 1 rearwardly projecting from the bearing 10 in a cantilever manner is enlarged, and accordingly this structure is disadvantageous as to such points as vibration, strength, weight, cost and decrease in a joint angle of the propeller shaft.

SUMMARY OF THE INVENTION

Accordingly, it is an object of the present invention to provide a speed meter drive device for an automobile which is advantageous in vibration and strength, and is lightweight and inexpensive.

It is another object of the present invention to provide a speed meter drive device which may decrease a joint angle of the propeller shaft.

According to the present invention, in a speed meter drive device including a speed meter drive gear mounted to an output shaft of a transmission or a transfer and a speed meter driven gear for driving a speed meter, the improvement is characterized in that the speed meter drive gear is provided on an outer circumferential surface of a connecting member mounted to the output shaft for driving a propeller shaft.

Various general and specific objects, advantages and aspects of the invention will become apparent when reference is made to the following detailed description of the invention considered in conjunction with the related accompanying drawings.

DETAILED DESCRIPTION OF THE PREFERRED EMBODIMENTS

Figure 1:
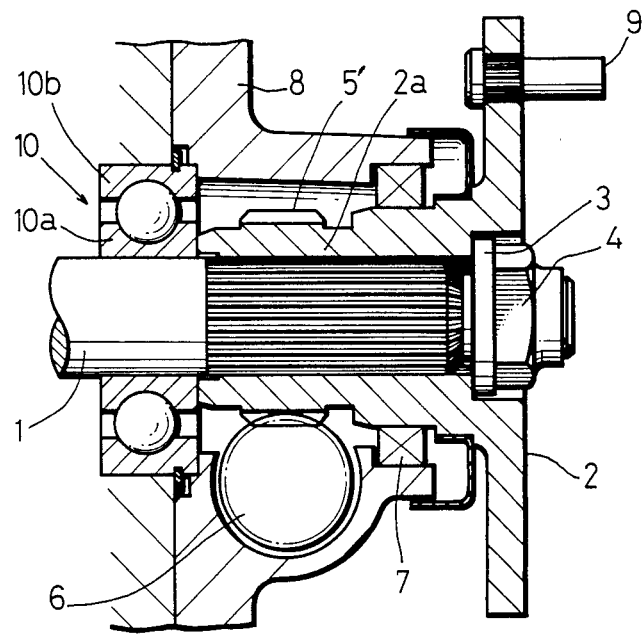
FIG. 1 is an elevational view in vertical section of a preferred embodiment.

Referring to FIG. 1 which shows a first preferred embodiment, the same reference numbers as in FIG. 4 designate the same members, and description thereof will be hereinafter omitted. In FIG. 1, a speed meter drive gear 5' is integrally formed with the boss portion 2a of the connecting member 2 on an outer circumferential surface at a front portion (a left-hand side in FIG. 1) thereof. The inner race 10a of the bearing 10 abuts against a front end of the boss portion 2a, and is mounted to the output shaft 1, while the outer race 10b is mounted to the housing 8. The speed meter driven gear 6 is mounted to the housing 8, and is meshed with the speed meter drive gear 5'.

Figure 4:
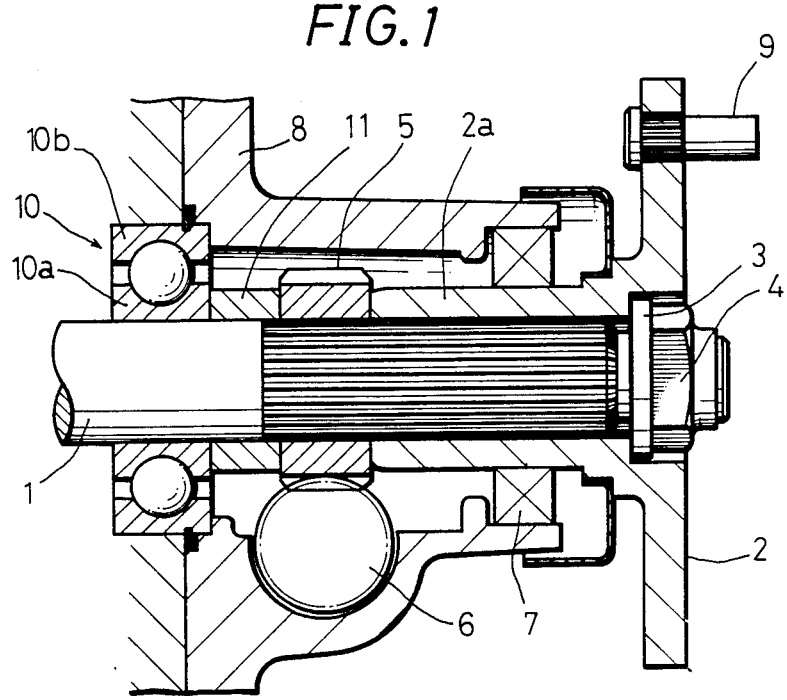
FIG. 4 is an elevational view in vertical section of a conventional speed meter drive device for an automobile.

With this arrangement, a free length portion of the output shaft 1 rearwardly projecting from the bearing 10 is shortened as compared with the prior art by the lengths of the speed meter drive gear 5 and the spacer 11 as shown in FIG. 4.

In the first preferred embodiment, it is necessary to demount the whole of the connecting member 2 so as to change a gear ratio of the speed meter drive gear 5', and as the connecting member 2 receives a large driving force, it is required to be formed of a heavy material such as iron.

Figures 2, 3:
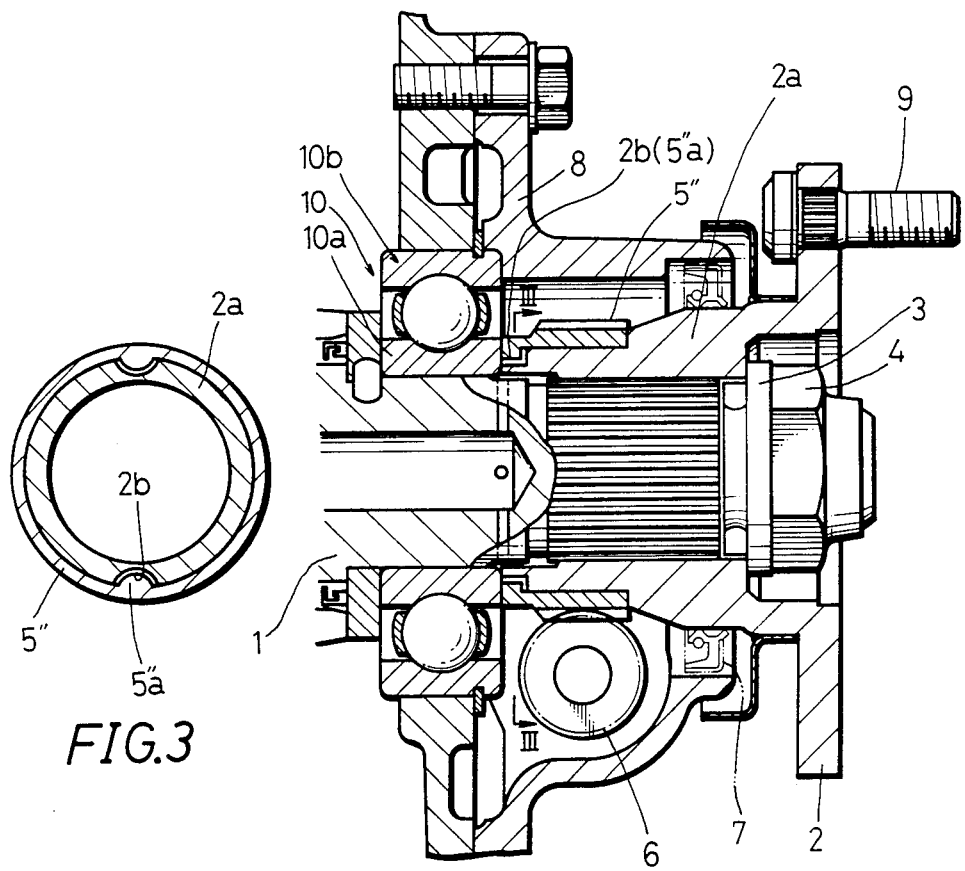
FIG. 2 is an elevational view in vertical section of another preferred embodiment.
FIG. 3 is a cross section taken along the line III—III in FIG. 2.

Referring to FIG. 2 which shows a second preferred embodiment, a ring-like speed meter drive gear 5" is formed independently of the connecting member 2, and is mounted thereto. The speed meter drive gear 5" is formed of lightweight materials such as light alloy or synthetic resin. The speed meter drive gear 5" is provided with an engagement projection 5"a on an inner circumferential surface thereof which is adapted to be engaged with an engagement groove 2b formed on the outer circumferential surface of the boss portion 2a of the connecting member 2. Thusly, the speed meter drive gear 5" is detachably mounted to the boss portion 2a. Further, the speed meter drive gear 5" is prevented from being disengaged from the boss portion 2a with the aid of the bearing 10. Further, the speed meter drive gear 5" may be fixed to the boss portion 2a by shrinkage fit or adhesion, etc.

Having thus described the preferred embodiments of the invention it should be understood that numerous structural modifications and adaptations may be resorted to without departing from the spirit of the invention.

What is claimed is:

1. A speed meter drive device for use with a vehicle comprising:

an output shaft projecting from a housing of a transmission or a transfer;

a connecting member mounted to a projected portion of said output shaft for transmitting a torque generated by said output shaft to another member;

a speed meter driven gear adapted to be rotated in cooperation with rotation of said output shaft to drive a speed meter; and a speed meter drive gear for rotating said speed meter driven gear;

wherein said speed meter drive gear is substantially cylindrical and is detachably mounted to an outer circumference of said connecting member, one end of said speed meter drive gear closest to said housing of said transmission or said transfer is in abutment against an inner race of a bearing installed between said housing and said output shaft, and the other end of said speed meter drive gear is in abutment against a stepped portion formed on said connecting member;

further wherein said speed meter drive gear is keyed to an outer circumference of said connecting member only at said one end of said speed meter drive gear, said speed meter drive gear including at least one projection which is keyed to at least one groove on said connecting member; and further wherein end surfaces of said projection and said groove, farthest from said bearing, are separated from one another.

* * * * *